E. J. FAIRES & C. W. STOCKBURGER.
SAW GAGE.
APPLICATION FILED MAY 23, 1914.
1,131,352.
Patented Mar. 9, 1915.
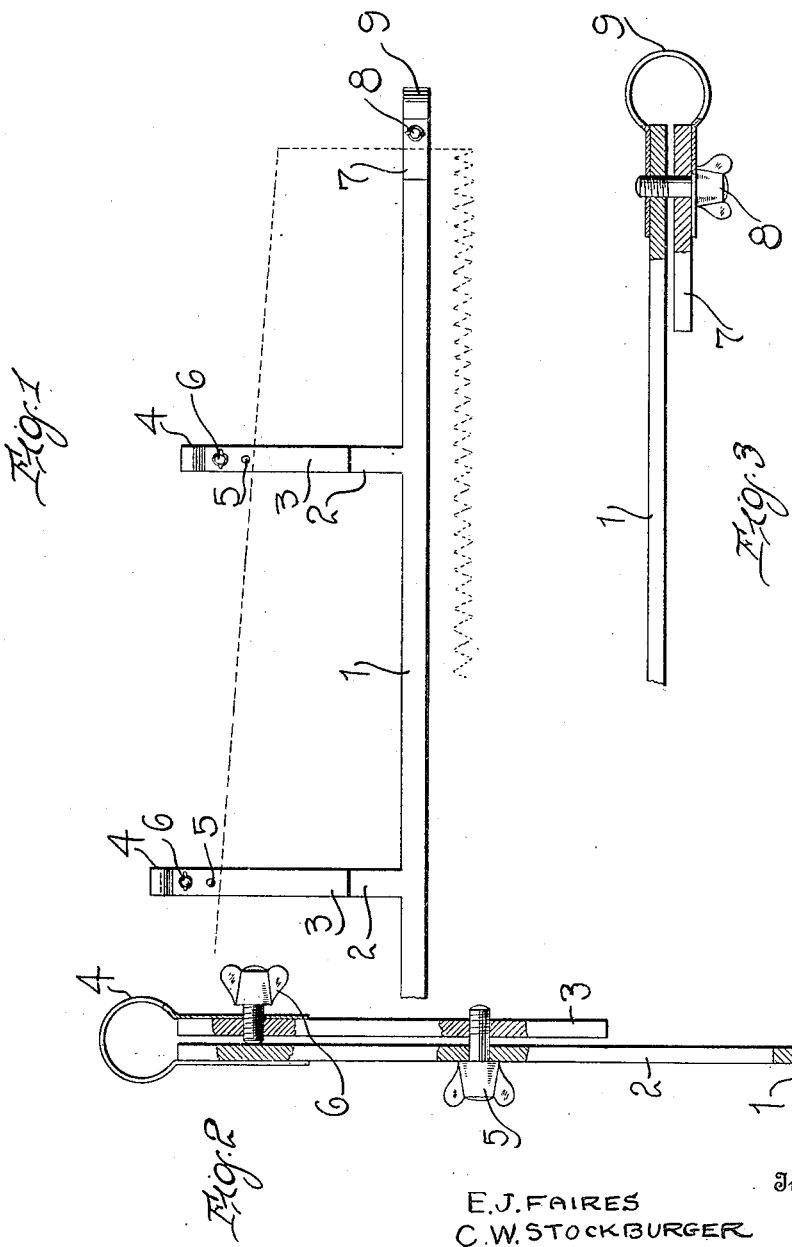
Witnesses
Robert M. Sutphen
A. J. Hind
Inventor
E. J. FAIRES
C. W. STOCKBURGER
By Watson E. Coleman
Attorney

UNITED STATES PATENT OFFICE.

ELISHA J. FAIRES AND CHARLES W. STOCKBURGER, OF McKINNEY, TEXAS.

SAW-GAGE.

1,131,352. Specification of Letters Patent. Patented Mar. 9, 1915.

Application filed May 23, 1914. Serial No. 840,610.

*To all whom it may concern:*

Be it known that we, ELISHA J. FAIRES and CHARLES W. STOCKBURGER, citizens of the United States, residing at McKinney, in the county of Collin and State of Texas, have invented certain new and useful Improvements in Saw-Gages, of which the following is a specification, reference being had to the accompanying drawings.

This invention relates generally to saw gages, and particularly to one adapted for use in connection with hand saws where the same is to be employed in cutting kerfs.

The object of the invention is to provide an attachment of this character which shall be exceedingly simple of construction, efficient and durable in use, and readily applied to position, and which shall be so constructed and arranged that when once adjusted relative to the saw blade, it will remain in place against any danger of shifting, whereby accuracy in the work accomplished will be assured.

With the above and other objects in view, as will appear as the nature of the invention is better understood, the same consists in the novel arrangement and combination of parts of a saw gage as will be hereinafter fully described and claimed.

In the accompanying drawing forming a part of this specification, and in which like characters of reference designate corresponding parts:

Figure 1 is a view in side elevation of a saw gage constructed in accordance with the present invention; Fig. 2 is an end elevation, partly in section, of the gage; Fig. 3 is a top plan view of the forward end of the gage bar, partly in section.

Referring to the drawing, 1 designates a gage bar which will be of a length to adapt it for use in connection with hand saws of standard makes. Rigid with the gage bar adjacent to each end and projecting from the same edge thereof are two saw clamps each in construction and operation a counterpart of the other except that the clamp that will be disposed at that end of the bar which will be the rear one in use is the longer in order to adapt the attachment to the angular disposition of the back of the saw relative to its edge. Each clamp consists of an arm 2 and a jaw 3, the two arms being either integral with the gage bar or secured thereto in any preferred manner. The arm and jaw are connected by a flat yoke-shaped spring 4, the terminals of the latter being either brazed or riveted to the two clamp members. Projecting loosely through the arm 2 at a point intermediate of the ends of the arm 3 is a thumb screw 5 that is threaded into the latter, and threaded into the arm 3 adjacent to its upper end and bearing at its inner end against the arm 2 is a second thumb screw 6, the screw 5 constituting a tension screw and the screw 6 a set screw. At the forward end of the gage bar is arranged a jaw 7 through which loosely passes the shank of a thumb screw 8, which is threaded into the gage bar. This jaw 7 and the gage bar has secured to it a spring 9, of the same general construction as the spring 4 on the clamps, and operates, when the thumb screw 8 is loosened, to move the jaw 7 away from the gage bar.

In the use of the attachment, the screws 5, 7 and 8 are loosened, and the saw is disposed between the clamps at the side and end of the gage bar. The set screws are now manipulated to adjust the clamps to the thickness of the saw blade, and when this has been accomplished, the tension screws are adjusted to cause the clamps tightly to impinge against the saw and thereby firmly secure the gage in place. Of course, it is to be understood that before the final tightening of the tension screws 5 and 8, the under edge of the gage bar will be properly adjusted relative to the cutting edge of the saw, so that the kerfs will be of the proper depth.

The improvements herein described are simple in character, will be found thoroughly efficient for the purposes designed and will result in the construction of an attachment which will not require any change whatever in the structural arrangement of the saw to adapt it for use in connection therewith.

We claim:

A kerfing attachment for saws comprising a gage bar, arms of different lengths projected from one edge thereof, jaw members arranged in opposed relation to the arms, yoke shaped springs connecting the arms and jaw members, a jaw arranged in opposed relation to the outer end of the gage bar, and means for clamping the arm and jaws into contact with the saw blade.

In testimony whereof we hereunto affix our signatures in the presence of two witnesses.

ELISHA J. FAIRES.
CHARLES W. STOCKBURGER.

Witnesses:
 RUBY LEE WILLIAMS,
 H. C. MILLER.

Copies of this patent may be obtained for five cents each, by addressing the "Commissioner of Patents, Washington, D. C."